(12) United States Patent
Lockwood (10) Patent No.: US 6,506,120 B1
(45) Date of Patent: Jan. 14, 2003

(54) FLEXIBLE SHAFT COUPLING

(76) Inventor: Dirk Lockwood, 2251 Yorktown Dr., SE., Kentwood, MI (US) 49508

( * ) Notice: Subject to any disclaimer, the term of this patent is extended or adjusted under 35 U.S.C. 154(b) by 0 days.

(21) Appl. No.: 09/906,265

(22) Filed: Jul. 16, 2001

Related U.S. Application Data (60) Provisional application No. 60/224,266, filed on Aug. 10, 2000.

(51) Int. Cl.⁷ .................................................. F16D 3/54
(52) U.S. Cl. .......................................... 464/88; 464/49
(58) Field of Search ........................... 464/49, 88, 154, 464/176; 403/222, 223

(56) References Cited

U.S. PATENT DOCUMENTS

| | | |
|---|---|---|
| 133,967 A | 12/1872 | Crane |
| 666,144 A | 1/1901 | Kennedy |
| 804,387 A | 11/1905 | Davis |
| 1,192,342 A | 7/1916 | Pelton |
| 1,458,894 A | 6/1923 | Schwarz |
| 1,983,007 A | 12/1934 | Simons |
| 2,067,271 A | 1/1937 | Johnson et al. |
| 2,079,460 A * | 5/1937 | Marty .................... 403/223 X |
| 2,172,662 A | 9/1939 | Kuhns et al. |
| 2,222,023 A * | 11/1940 | Ferris .......................... 464/49 |
| 2,380,113 A | 7/1945 | Kuhns |
| 2,409,385 A | 10/1946 | Pletcher |
| 2,430,683 A | 11/1947 | O'Malley |
| 2,533,597 A | 12/1950 | Maier |
| 2,655,798 A * | 10/1953 | Neher ........................ 464/154 |
| 2,859,599 A | 11/1958 | Case |
| 2,885,232 A | 5/1959 | Eberly |
| 2,918,809 A | 12/1959 | Miller |
| 2,952,143 A | 9/1960 | Case |
| 3,095,714 A | 7/1963 | Schlotmann |
| 3,137,149 A | 6/1964 | Schlotmann |
| 3,174,302 A | 3/1965 | Pomper |

(List continued on next page.)

OTHER PUBLICATIONS

Mancuso, J., "Couplings and Joints" 2nd ed., New York, Marcel Dekker, p. 40, TJ183.M36 1999.*

Primary Examiner—Lynne H. Browne
Assistant Examiner—Greg Binda
(74) Attorney, Agent, or Firm—Van Dyke, Gardner, Linn & Burkhart, LLP (57) ABSTRACT

A coupling device includes first and second coupling members for connecting a rotary driving member to a rotary driven member. The first and second coupling members are generally semi-cylindrical and connectable together along there opposite edges to non-rotatably secure the driving member to the driven member. The coupling members include a stop portion at at least one end thereof to limit longitudinal movement of the coupling device relative to the rotary members. The coupling members may be flexible to facilitate wrapping of the coupling members about the rotary members to non-rotatably retain the rotary members within the coupling device. The coupling members are fastened together at their edges via a fastening member which is insertable through a passageway in the corresponding edges of the coupling members.

18 Claims, 4 Drawing Sheets

U.S. PATENT DOCUMENTS

| | | |
|---|---|---|
| 3,303,669 A | 2/1967 | Oetiker |
| 3,313,124 A | 4/1967 | Filepp |
| 3,423,957 A | 1/1969 | Palmer |
| 3,524,332 A | 8/1970 | Callies |
| 3,588,154 A | 6/1971 | Voight |
| 3,628,352 A | 12/1971 | Stuemky |
| 3,635,049 A | 1/1972 | Schlotmann et al. |
| 3,874,194 A | 4/1975 | Filepp et al. |
| 4,098,096 A | 7/1978 | Chard et al. |
| 4,217,061 A | 8/1980 | Eiland et al. |
| 4,373,925 A | 2/1983 | Fickelscher |
| 4,411,634 A | 10/1983 | Hammelmann |
| 4,662,859 A | 5/1987 | Sakai et al. |
| 4,789,376 A | 12/1988 | Grant |
| 4,913,681 A | 4/1990 | Green |
| 4,917,653 A | 4/1990 | Collucci |
| 5,000,613 A | 3/1991 | Heald et al. |
| 5,062,734 A | 11/1991 | Vanzee et al. |
| 5,069,054 A | 12/1991 | Hladky et al. |
| 5,139,460 A * | 8/1992 | Hoyt, III et al. ............... 464/88 |
| 5,255,895 A | 10/1993 | Jussilla |
| 5,295,911 A * | 3/1994 | Hoyt, III et al. ............... 464/88 |
| 5,586,938 A | 12/1996 | Schurhorster |
| 5,681,126 A | 10/1997 | Lin |
| 5,921,750 A | 7/1999 | Gatz |
| 6,009,609 A | 1/2000 | Hanno |
| 6,109,817 A | 8/2000 | Burns et al. |

\* cited by examiner

FLEXIBLE SHAFT COUPLING

CROSS-REFERENCE TO RELATED APPLICATION

The present application claims priority on U.S. provisional application, Ser. No. 60/224,266, filed Aug. 10, 2000, which is hereby incorporated herein by reference in its entirety.

FIELD OF THE INVENTION

The present invention relates generally to rotary shaft couplings and, more particularly, to a shaft coupling which connects a gear or sprocket driving member to a corresponding driven member.

BACKGROUND OF THE INVENTION

Shaft gear couplings are known for interconnecting a rotatable driving shaft and/or toothed member of a machine with a generally coaxially positioned and rotatably driven shaft and/or toothed member, such that rotation of the driving shaft causes a corresponding rotation of the driven shaft via the coupling. The coupling allows for misalignment of the toothed members or shafts, such as axial offsets or angular misalignments or both. Shaft couplings are typically cylindrical couplings, which slide along the shafts into position over the toothed members, such as sprockets or gears, of the shafts, or are two sleeves which are bolted together about the toothed members. However, in order to couple the shafts together, one of the shafts may need to be removed or the shafts may need to be separated enough to fit the cylindrical coupler or sleeve onto the shafts. Additionally, because such a coupling is slidable onto the toothed members, it may require additional lock rings, bolts or the like to prevent sliding off the gear members during operation of the machine. Often, a middle element or membrane is positioned within the coupling to limit such longitudinal movement in both directions.

Some couplings include a plastic coupler which mounts to a driving shaft and receives rotary member therein which is mounted to another, generally coaxially positioned shaft. Such a coupling obviates the need for a second gear of sprocket member. However, because the coupling is all plastic, it may tend to slip or crack at the connection to the shaft, and is thus not applicable to applications which transmit higher torques between the shafts.

Other couplings have been developed which connect the two shafts via a chain coupling, whereby a chain is wrapped around the sprocket members of the shafts to retain the members together. Because chain couplings include a plurality of joints which bend to fit around the sprocket members, chain couplings typically require periodic lubrication to prevent the joints from binding over time. Additionally, many chain couplings further require a cover over the chain coupling to prevent dirt and other contaminants from collecting on the joints of the chain, which may inhibit performance of the coupling.

SUMMARY OF THE INVENTION

The present invention is intended to provide a coupling device for connecting a pair of rotary members, such that rotation of one of the members causes a corresponding rotation of the other member via the coupling device. The coupling device is a two piece coupling device, wherein the two pieces or halves may be easily positioned about the rotary members and secured together to retain the rotary members within the coupling device.

According to one aspect of the present invention, a coupling device for connecting a rotary-driving member to a rotary driven member comprises a first coupling member and a second coupling member. The rotary members include a plurality of teeth around a circumference thereof. The first and second coupling members include a plurality of teeth extending longitudinally therealong. The first and second coupling members have a shape that is generally semi-cylindrical, and include a pair of first and second edges extending longitudinally along opposite sides of the first and second coupling members. The second coupling member is connectable to the first coupling member about the rotary members along the first and second edges of the first and second coupling members. When connected, the first and second coupling members are adapted to non-rotatably retain the rotary members therewithin, whereby the plurality of teeth of the first and second coupling members are adapted to engage the plurality of teeth of the rotary members. The first and second coupling members are operable to limit longitudinal movement of the coupling device relative to the rotary members.

Preferably, the coupling members are secured together via a fastener or pin inserted at least partially through the first and second edges of the coupling members along each side thereof. Preferably, each coupling member includes a decreased circumference or diameter stop portion at one end, which limits longitudinal movement of the coupling member relative to the toothed rotary members. When the coupling members are connected together, the stop portion of one coupling member is at one end and the stop portion of the other coupling member is at the opposite end of the coupling device, such that each stop portion limits longitudinal movement of the coupling device in that particular direction.

According to another aspect of the present invention, a flexible coupling device for connecting a rotary driving member to a rotary driven member of a line shaft conveyor comprises a first coupling member and a second coupling member. The rotary members of the line shaft conveyor include a plurality of teeth around a circumference thereof. The first coupling member includes a plurality of teeth extending longitudinally therealong and first and second ends. The first coupling member has a shape that is generally a portion of a cylinder and comprises a flexible material. The second coupling member includes a plurality of teeth extending longitudinally therealong and first and second ends. The second coupling member has a shape that is generally another portion of the cylinder and also comprises a flexible material. The first and second coupling members are flexible and adapted to flex and wrap about the rotary driving and driven members. The plurality of teeth of the first and second coupling members are adapted to engage the plurality of teeth of the rotary members when the first and second coupling members are wrapped about the rotary member. The first and second coupling members are joined and securable together when the first and second coupling members are wrapped about the rotary members.

Preferably, the first and second coupling members define a generally continuous cylindrical casing when the first and second coupling members are wrapped about the rotary members. Preferably, the first and second coupling members include first and second longitudinal stop portions at each end of the coupling members. The first and second stop portions correspond with one another to define first and second stop walls at opposite ends of the flexible coupling device when the coupling members are secured together. The stop walls limit longitudinal movement of the flexible coupling device relative to the rotary members. The first and second coupling members may include overlapping end portions at the first and second ends thereof for a fastening member to be insertable through a passageway in the overlapping end portions to secure the first and second coupling members together. The first and second coupling members may also be pivotable about one of the fastening members to wrap the flexible coupling device about the rotary members, while the other of the fastening members is insertable to secure the first and second coupling members about the rotary members. Preferably, the first and second coupling members comprise a rubber material, such as neoprene rubber or the like.

According to another aspect of the present invention, a coupling device for connecting a rotatable shaft to a sprocket member includes a rotary member and a coupling member. The sprocket member has a plurality of teeth around a circumference thereof. The rotary member includes a central portion having a mounting opening therethrough and a plurality of teeth extending from the rotary member, the mounting opening being adaptable to receive the rotatable shaft therethrough for non-rotatably securing the coupling device to the rotatable shaft and being rotatable therewith. The coupling member is molded about the rotary member. The teeth of the rotary member are within the coupling member to non-rotatably retain the rotary member within the coupling member. The coupling member includes a sprocket member receiving portion extending longitudinally from the rotary member for non-rotatably receiving the sprocket member therewithin. The sprocket member receiving portion includes a plurality of teeth extending longitudinally therealong. The first coupling member has a generally cylindrical shape. The plurality of teeth of the sprocket member receiving portion are adapted to engage the plurality of teeth of the sprocket member when the sprocket member is received within the sprocket member receiving portion.

Therefore, the present invention provides a coupling device which may be easily secured about a pair of corresponding rotary members. Because the coupling device comprises two pieces or halves, the rotary members need not be separated or removed to position the coupling device about the rotary members for connection thereto. Additionally, the decreased circumference stop portions limit or substantially preclude longitudinal movement of the coupling device relative to the rotary members beyond an operable range of the coupling device.

These and other objects, advantages, purposes and features of this invention will become apparent upon review of the following specification in conjunction with the drawings.

DESCRIPTION OF THE PREFERRED EMBODIMENTS

Figure 1:
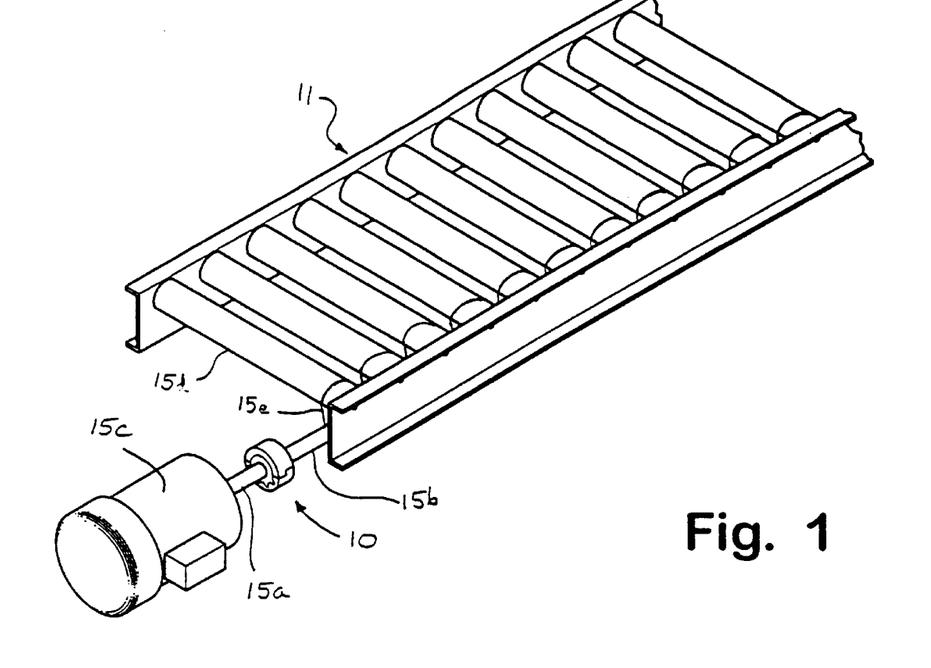
FIG. 1 is a perspective view of a line shaft conveyor with a coupling device in accordance with the present invention.

Referring now to the drawings and the illustrative embodiments depicted therein, a coupling device 10 couples a pair of rotary members of adjacent shafts 15a, 15b of a line shaft conveyor 11 (FIG. 1). One shaft 15a is rotatably driven via a rotational motor 15c, or another driven line shaft, while the other shaft 15b is rotatably driven via shaft 15a and coupling device 10 and the rotary or sprocket members at each shaft 15a, 15b. The driven shaft 15b functions to rotatably drive a plurality of rollers 15d or the like via a plurality of bands 15e corresponding to each driven roller 15d.

Figure 2:
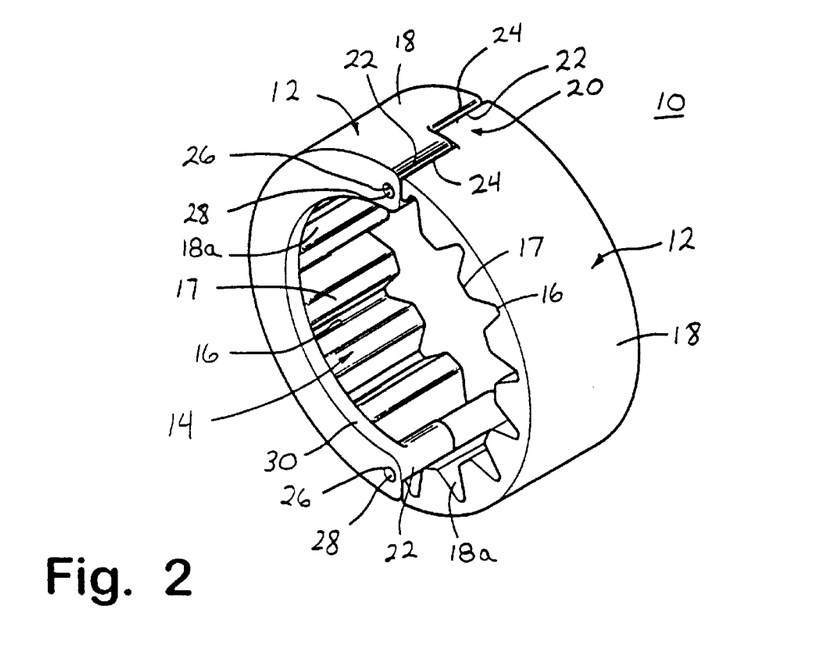
FIG. 2 is a perspective view of a coupling device in accordance with the present invention.
Figure 3:
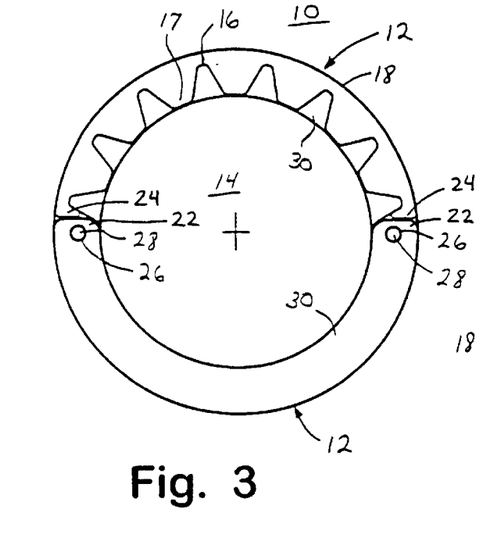
FIG. 3 is an end elevation of the coupling device of FIG. 2.

Coupling device 10 includes a pair of couplings members 12, which are connectable together to define a cylindrical cavity 14 within coupling device 10 (FIGS. 2 and 3). Cylindrical cavity 14 is adapted to receive one or more rotary or sprocket members 13 (FIGS. 7 and 8A–C), such as a powered or driving rotating toothed member and a rotatably driven toothed member, such that rotation of the driving member causes corresponding rotation of the driven member via coupling device 10. The rotary toothed members may be sprockets, gears or the like. Each coupling member 12 includes a plurality of grooves or indentations 16 and teeth 17 extending therealong for engagement with corresponding teeth or projections 13a of the rotary members 13, such that the rotary members are non rotatably received within cavity 14 of coupling device 10 via engagement of the teeth of the rotary members with the grooves 16 and teeth 17 of the coupling members 12.

Figure 4:
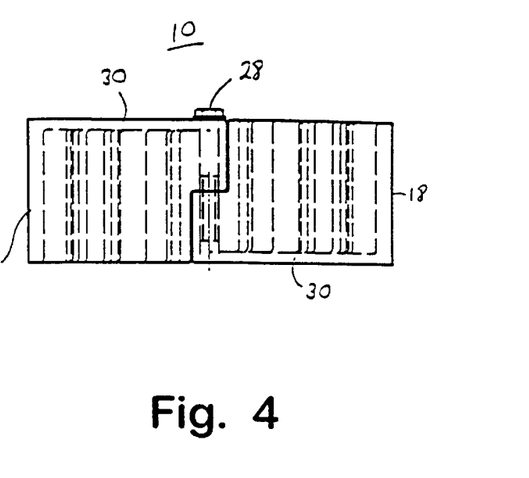
FIG. 4 is a plan view of the coupling device of FIG. 2.
Figure 5:
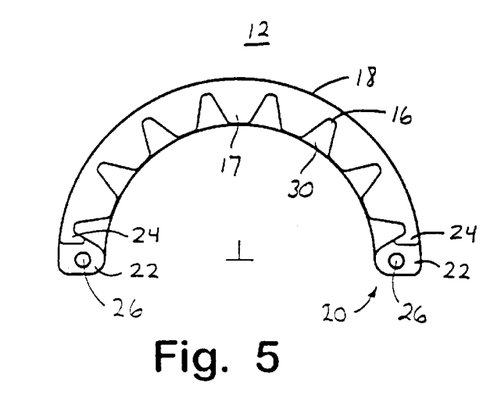
FIG. 5 is an end elevation of one coupling member of the coupling device of FIG. 2.

Grooves or channels 16 and corresponding teeth 17 are formed along an interior surface 18a of a partial cylindrical body 18 of each coupling member 12, such that the channels 16 may receive external teeth or projections 13a on the rotary gear or sprocket members 13. Channels 16 and teeth 17 of coupling members 12 extend generally the length of each coupling member 12. Preferably, each coupling member 12 includes an end or stop portion 30 which provides an end stop or wall or flange at one end of the channels 16 and teeth 17, while an opposite end 32 of the channels 16 and teeth 17 are open or unrestricted. The coupling members 12 are then connected together with each member facing in a generally opposite direction from the other, as shown in FIGS. 3 and 4, such that the end walls 30 are located at opposite ends of coupling device 10. This limits or substantially precludes longitudinal movement of coupling device 10 in both directions relative to the rotary members.

Figure 6:
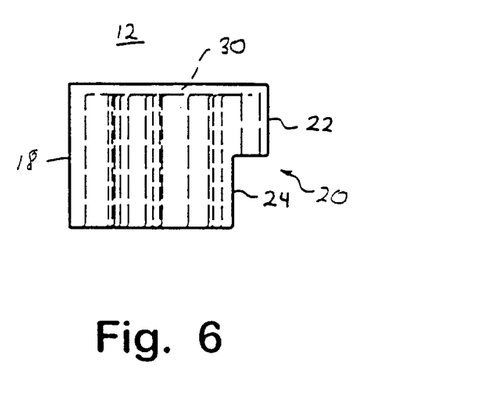
FIG. 6 is a plan view of the coupling member of FIG. 5.
Figure 7:
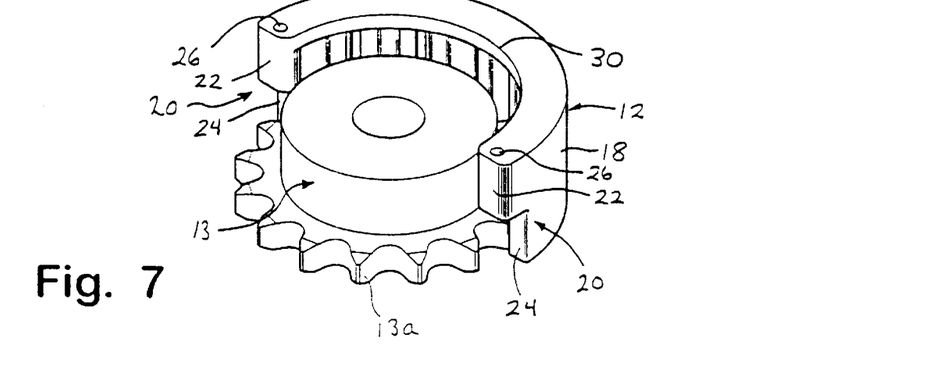
FIG. 7 is a perspective view of the coupling member of FIGS. 5 and 6, as positioned about a rotary member.
Figure 8A:
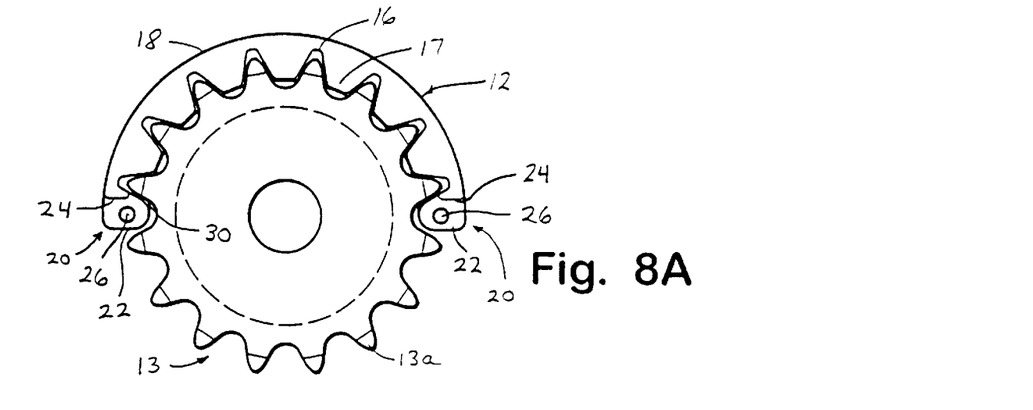
FIG. 8A is an end elevation of the coupling member and rotary member of FIG. 7.
Figure 8B:
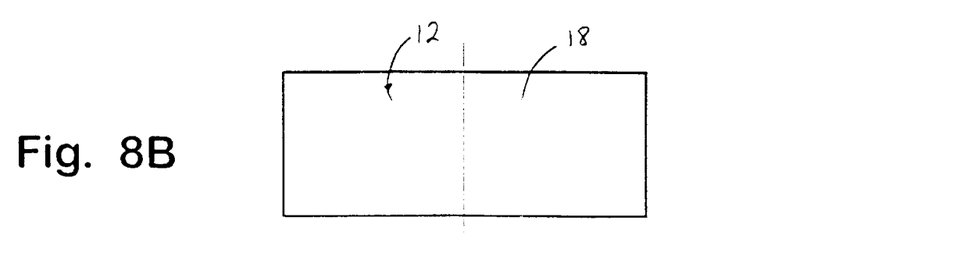
FIG. 8B is a top plan view of the coupling member and rotary member of FIGS. 7 and 8A.
Figure 8C:
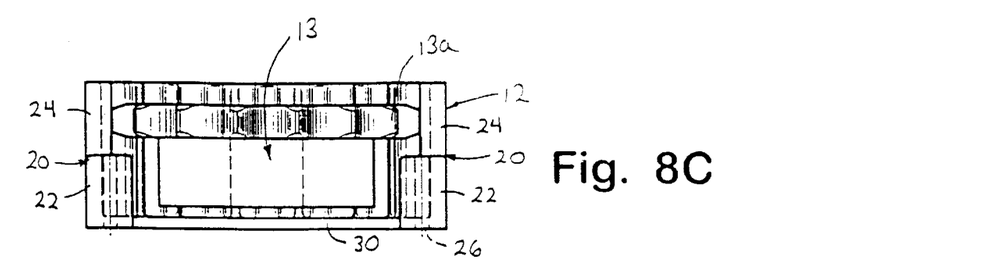
FIG. 8C is a bottom plan view of the coupling member and rotary member of FIGS. 7, 8A and 8B.

The partial cylindrical bodies 18 of both coupling members 12 combine to define a cylindrical coupling device. One of the coupling members 12 defines one portion of the cylindrical coupling device, while the other coupling member defines the other portion of the cylinder. Preferably, body 18 of each coupling member 12 defines a half cylinder, such that the coupling members are substantially similar to one another. The partial cylindrical body 18 of each coupling member 12 includes a pair of longitudinally extending edges 20 along opposite sides of body 18. As best shown in FIGS. 2, 6 and 7, each of the edges 20 includes a raised or stepped portion 22 and an indented or recessed portion 24. Raised or stepped portion 22 of each coupling member 12 includes a generally cylindrical passageway 26 for receiving a generally cylindrical pin or axle 28 therethrough to retain the coupling members 12 together, as discussed below. Recessed portion 24 of each edge 20 is formed to receive a corresponding stepped portion 22 of the other coupling member 12 when the coupling members are connected together about the rotary members, such that the cylindrical passageways 26 of the respective stepped portions 22 are aligned for insertion of pin 28 therethrough.

Although shown and described as including a pin or axle along both sides of coupling members 12, the coupling members may be pinned, snapped or otherwise connected and retained together via any known means, such as pins, screws, bolts and nuts, cap-style screws or the like, and may include tabs and corresponding slots or the like to snap together about the rotary members, without affecting the scope of the present invention.

Preferably, coupling device 10 comprises a polymeric material, such as delrin, nylon, or other plastic materials, including plastic materials which are partially filled with fibers, or the like. However, clearly other materials may be implemented without affecting the scope of the present invention. The length of the coupling members may be selected according to the size of the rotary members and any desired gap therebetween. In the illustrated embodiment, the coupling members are common parts, whereby one member is reversed relative to the other, such that the two members mate together at their respective opposite edges.

The two piece construction of coupling device 10 facilitates easy implementation of coupling device 10 at or around a pair generally coaxially positioned rotary members. The channels and teeth of the coupling members and of the rotary members are aligned as each coupling member is applied to the shaft and sprocket or gear from the side of the shaft. The coupling members are slid longitudinally onto the rotary members from opposite ends of the rotary members until the stepped portions engage and mate with one another. The coupling members may then be coupled and secured together about the rotary members via insertion of pin or axle 28 through openings or passageways 26 in coupling members 12 when the passageways of both of the two couplings members are aligned. Each coupling member 12 thus engages the sprocket or gear teeth 13a on the rotary members 13 and non-rotatably secures the coupling device 10 around the rotary members. Because the coupling members are engaged with the teeth at the sprocket and transmit the torque of the driving member to the driven member via such engagement, the pins 28 function primarily to hold the coupling members together and do not transmit the torque of the driving rotary member. The stop portions limit or substantially preclude longitudinal movement of the rotary members relative to the coupling device, in order to prevent one or both of the rotary members from becoming disengaged with the coupling device during operation.

Because coupling device 10 may easily connect a pair of rotary members together, without having to separate the shafts, coupling device 10 may be used with existing sprockets or gears, with no re-working or modifications being necessary to the sprockets or shafts or the respective motors or machines for implementation of coupling device 10. Therefore, each half of coupling device 10 may be positioned or slid over the rotary members from their respective direction, such that coupling device 10 does not have to be installed on the shaft prior to installation of the toothed members. Coupling device 10 receives the rotary members within the cylindrical cavity and accommodates for misalignment of the members relative to one another. For example, the axes of the rotary members may be offset from one another or may be angularly misaligned or both, while still being engagable with the channels 16 and teeth 17 of coupling members 12 of coupling device 10. Additionally, because coupling device 10 does not include a center or separating membrane or element, coupling device 10 easily accommodates axial and/or longitudinal misalignment. Coupling device 10 is adapted to account for a substantial amount of misalignment between the rotary members, while still effectively transmitting the torque from the driving member to the driven member. Additionally, because coupling device 10 is non-rotatably mounted to the rotary members and rigidly connected together, there are no relatively moving parts of coupling device 10, such that coupling device 10 does not require lubrication or other periodic maintenance.

Although shown and described as having a two piece construction, it is further envisioned that the principles of the present invention may be applied to a one piece coupling device which may be slidable along the shaft of one of the rotary members into position over and around both of the sprocket or gear members. The coupling device may further include one or more retaining rings (not shown) or the like to hold or retain the coupling device in position about the rotary members. Additionally, it is envisioned that a one or two piece coupling device may be secured directly to a shaft and receive one sprocket or gear member within a toothed, generally cylindrical cavity, in order to non-rotatably connect a shaft to a rotary member, without affecting the scope of the present invention.

Figure 9:
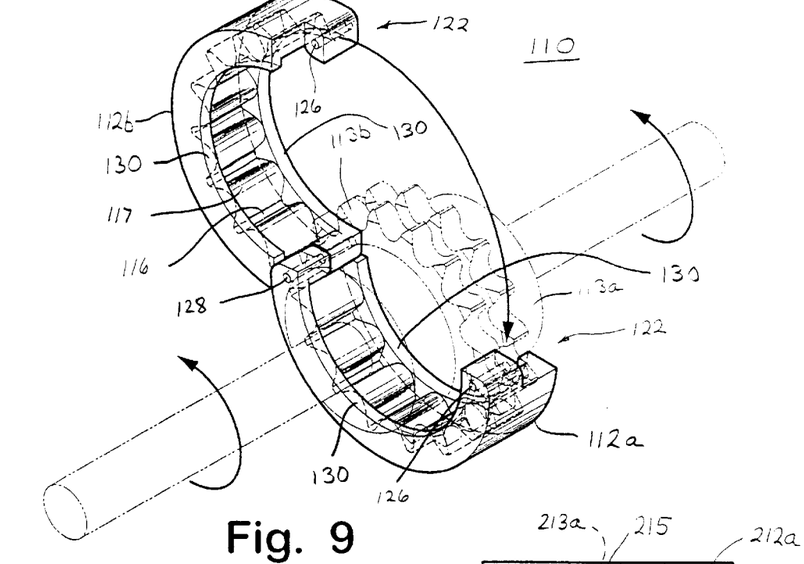
FIG. 9 is a perspective view of an alternate embodiment of a flexible coupling device in accordance with the present invention.

Referring now to FIG. 9, a flexible coupling device 110 includes a pair of coupling members 112a, 112b, which are connectable together to define a cylindrical cavity within the coupling device 110 when they are secured together at their respective opposite edges. Similar to coupling device 10, discussed above, the cylindrical cavity is adapted to receive one or more rotary members 113a, 113b, such as sprockets, gears or the like. Each coupling member 112a, 112b includes a plurality of grooves or indentations 116 and corresponding teeth 117 formed along an interior surface of the partial or half cylindrical body of coupling member 112a, 112b for engagement with the corresponding teeth or projections of the rotary members, such that the rotary members are non-rotatably received within the cylindrical cavity of coupling device 110.

Each of the partial cylindrical coupling members 112a, 112b of flexible coupling device 110 are formed from flexible material, such neoprene rubber or the like. Because coupling device 110 is made of a flexible material, the coupling members 112a, 112b may be pinned together at one end and flexed so as to wrap around the sprockets to position the sprockets within the cylindrical cavity of the coupling device 110. This facilitates easy installation of the coupling device 110 around the sprockets of a drive shaft and driven shaft of a line shaft conveyor. Preferably, the material used for the coupling device 110 is neoprene rubber, but other flexible and strong materials could be used, without affecting the scope of the present invention. Preferably, the selected material is highly oil resistant, in order to repel any oil which may be on the sprockets of the shafts. The selected material is preferably strong enough and durable enough to be used on up to approximately a two horse power drive motor or greater, and functions to transmit the torque from the drive shaft and sprocket to the driven sprocket and shaft.

Similar to coupling members 12 of coupling device 10, discussed above, each coupling member 112a, 112b includes a stepped portion 122 at each edge of the partial cylindrical member, such that the stepped portions 122 of the two coupling members 112a, 112b overlap and engage with one another as the coupling members are assembled together to define the cylindrical coupling device 110. A fastener, such as a cylindrical pin or axle 128 is inserted through an opening or passageway 126 through the corresponding raised or stepped portions 122 of each coupling member 112a, 112b, to secure the coupling members together around the sprockets. As discussed above with respect to coupling device 10, the fastener may be any known fastening means, such as a screw, bolt or any other known fastening means, without affecting the scope of the present invention.

Each coupling member 112a, 112b further includes an end or stop portion or flange 130 which provides an end stop or wall at each end of the channels 116 and teeth 117, such that when the coupling members are secured together about the sprockets to form the cylindrical coupling device, the end or stop portions 130 define a generally circular wall or flange at each end of coupling device 110. The circular stop wall at each end of coupling device 110 substantially limits or precludes longitudinal movement of coupling device 110 in either direction with respect to the rotary sprockets when coupling device 110 is assembled around a pair of rotary sprockets.

Because the coupling members 112a, 112b are formed of a flexible material, an edge of each member may be fastened or pinned to a corresponding edge of the other member when the coupling device is positioned adjacent to the sprockets which are to be coupled together by coupling device 110. The teeth of the sprockets may then be engaged with the channels 116 and teeth 117 of the coupling members and the coupling members may be flexed so as to wrap around the teeth of the sprocket members, such that the coupling members sequentially engage each tooth of a sprocket member as it is wrapped therearound. Once coupling device 110 is fully wrapped around the pair of coupled sprocket members, a second fastener or pin is inserted through the opening or passageway 126 through the overlapping stepped edge portions 122 of the opposite edges of the coupling members 112a, 112b from the first pinned edges or joint. The coupling device 110 is thus secured around the sprocket members and operable to transmit the torque between the sprocket members, while limiting longitudinal movement of the coupling device with respect to the sprocket members via the end wall 130 at each end of coupling device 110.

Although shown and described as having a two piece construction, it is further envisioned that the coupling device of the present invention may be formed as a one piece flexible member having opposite overlapping edges which are securable together via a fastener, such as a pin, screw, bolt or the like, whereby the entire coupling device is wrapped sequentially about each tooth of the corresponding sprocket members until the sprocket member is engaged with all of the channels and teeth along the interior surface of the coupling device. A single fastener may then be inserted through the overlapping edge portions of the coupling device to secure the coupling device in place about the sprocket members.

Because coupling device 110 may easily connect a pair of rotary members or sprocket members together, without having to separate the shafts to position the coupling device at the sprockets, coupling device 110 may be used with existing sprockets or gears, with no reworking or modifications being necessary to the sprockets or shafts or to the respective motors or machines for implementation of coupling device 110. The coupling device 110 may be wrapped around the adjacent sprocket members to receive the members within the cylindrical cavity defined by coupling device 110. Each coupling member thus may include a stop wall or flange at each end thereof, since the flexible coupling members do not have to slide onto the adjacent sprocket members to secure the sprocket members within the flexible coupling device.

Coupling device 110 accommodates for misalignment of the members relative to one another, such that the axes of the rotary members may be offset from one another or may be angularly misaligned or both, while still being fully engagable with the channels and teeth of the coupling members of device 110. Additionally, if desired, because coupling device 110 does not include any center or separating member or element, coupling device 110 also accommodates axial and/or longitudinal misalignment of the rotary or sprocket members with respect to one another. Additionally, because coupling device 110 is non-rotatably secured to the rotary members and generally rigidly connected together via the pins, screws, bolts or the like, there are no relatively moving parts of coupling device 110, such that coupling device 110 requires minimal or no lubrication or other periodic maintenance.

Therefore, the present invention provides a flexible coupling member which may be easily implemented at a pair of adjacent sprocket members to couple the sprocket members together and transmit the torque therebetween. The flexible coupling device may be easily installed to the sprocket members by flexing the coupling and wrapping the coupling device about the sprocket members, whereby each tooth of the sprocket members sequentially engage the channels and teeth of the coupling device until all of the teeth of sprocket members are fully engaged within the cylindrical cavity defined by the flexible coupling device. The flexible coupling device may be implemented at any pair of adjacent shafts and sprocket members, and is especially adapted for use with a line shaft conveyor, whereby the torque being transmitted is low enough to allow for a flexible, non-rigid material for coupling device 110.

In an alternate embodiment, a coupling device 210 (FIGS. 10A and 10B) includes a coupling member 212 which is molded about a toothed member 213, such that the coupling member 212 and toothed member 213 may be secured to a shaft and receive a generally coaxially positioned rotary toothed member within the coupling device. Coupling member 212 includes a shaft mounting portion 212a and a rotary member receiving portion 212b. The rotary member receiving portion 212b defines a generally cylindrical and toothed cavity 214 for receiving a second rotary member (not shown) which is generally coaxially positioned adjacent to the shaft at which coupling device 210 is mounted or secured. The rotary member receiving portion 212b includes a plurality of channels or grooves 216 and corresponding teeth 217 extending longitudinally along cavity 214 to non-rotatably retain the second rotary member with the toothed or sprocket member 213 of coupling device 210.

Figures 10A, 10B:
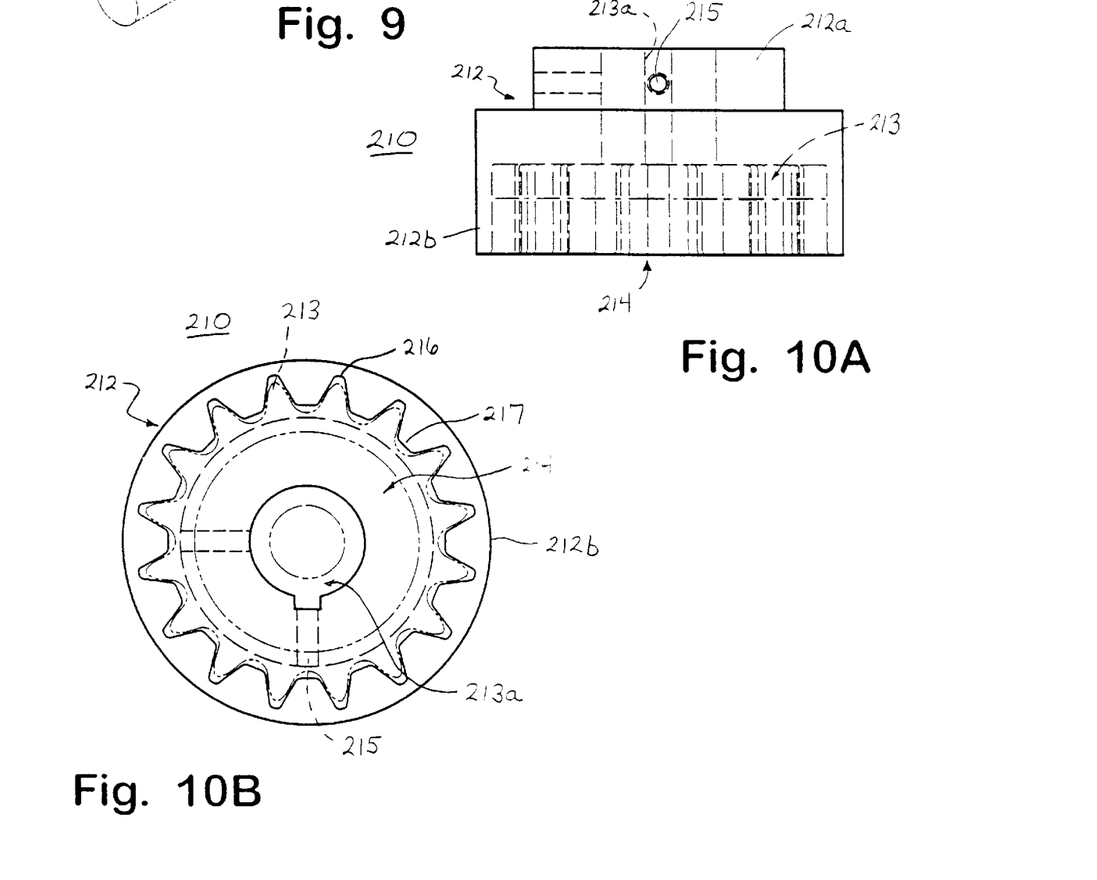
FIG. 10A is a plan view of an alternate embodiment of a coupling device in accordance with the present invention, which includes a toothed member keyed to secure to a shaft.
FIG. 10B is an end elevation of the coupling device of FIG. 10A.

In the illustrated embodiment, the toothed member 213 and shaft mounting portion 212b include a non-circular or keyed opening 213a, which allows the coupling device to slide along a correspondingly non-circular shaft and be non-rotatably secured thereto, via engagement of the non-circular shaft and opening. The shaft and opening may be keyed or may be a hexagonal shape or the like, to prevent relative rotation therebetween. The coupling member 212 and toothed member 213 may then be secured to the shaft via a set screw or the like through an opening 215 in shaft mounting portion 212a, to limit or substantially preclude longitudinal movement of the coupling device and the toothed member along the shaft.

Because coupling device 210 includes a conventional type rotary or sprocket member within the plastic coupling member, coupling device 210 is robust enough to transmit the torque between the rotary members and shafts while remaining non-rotatably retained on a respective shaft, and may easily be installed on conventional shafts and rotary members. This provides a substantial improvement over the plastic drive couplings of the prior art, which are non-rotatably secured to the shaft via a plastic member, and are thus not practical for applications where higher torque is to be transmitted from one shaft to another. The coupling device 210 enhances the strength of the connection to the shaft by having a plastic coupling member molded over and around a standard sprocket or gear member, with the shaft bore, keyway and set screw formed in the sprocket member and a corresponding keyway formed in the coupling member.

Therefore, the present invention provides a coupling device which is easily attachable to and detachable from a pair of generally axially aligned rotary members. The coupling device includes a pair of side coupling members, which are pinned or otherwise connected together around the rotary members, whereby the rotary members are non-rotatably received within a cavity defined by the side members of the coupling device. Because each side coupling member includes an end or stop portion at one end, longitudinal movement of the coupling device along the rotary members is limited or substantially precluded at each end of the coupling device. This ensures that the coupling device will remain fully engaged with the rotary members when in use.

Changes and modifications in the specifically described embodiments can be carried out without departing from the principles of the invention, which is intended to be limited only by the scope of the appended claims, as interpreted according to the principles of patent law.

The embodiments of the invention in which an exclusive property right or privilege is claimed are defined as follows:

1. A flexible coupling device for connecting a rotary driving member to a rotary driven member, the rotary members having a plurality of teeth around a circumference thereof, said coupling device comprising:

a first coupling member which includes a plurality of teeth extending longitudinally therealong, said first coupling member having a shape that is generally a portion of a cylinder having first and second end portions, said first coupling member comprising an integral member made of flexible material; and a second coupling member which includes a plurality of teeth extending longitudinally therealong, said second coupling member having a shape that is generally another portion of said cylinder having first and second end portions, said second coupling member comprising an integral member made of flexible material, said first end portion of said first coupling member being hingedly coupled with said first end portion of said second coupling member, said second end portion of said second coupling member being connectable to said second end portion of said first coupling member when said first and second coupling members are wrapped about the rotary members, said first and second coupling members being adapted to retain the rotary driving and driven members therewithin, said plurality of teeth of said first and second coupling members being adapted to engage the plurality of teeth of the rotary members when said first and second coupling members are connected about the rotary members, said first and second coupling members being operable to limit longitudinal movement of said coupling device relative to the rotary members.

2. The coupling device of claim 1, wherein said first end portions of said first and second coupling members are hingedly coupled together via at least one fastening member extending through at least a portion of said second end portions.

3. The coupling device of claim 1, wherein said second end portions of said first and second coupling members are connectable together via at least one fastening member extending longitudinally through at least a portion of said second end portions.

4. The coupling device of claim 3, wherein said second end portions at least partially overlap one another, said fastening member extending through an overlapping portion of said second end portions.

5. The coupling device of claim 3, wherein said first end portions of said first and second coupling members are hingedly coupled together via a pinned member, said first coupling member being movable relative to said second coupling member to open said coupling device to adapt said coupling device to receive the rotary members therewithin.

6. The coupling device of claim 5, wherein said first and second coupling members are flexible to wrap around the rotary members and to pivot relative to one another about said first end portions.

7. The coupling device of claim 1, wherein said teeth of said first and second coupling members are internal teeth and are adapted to engage external teeth on the rotary members.

8. The coupling device of claim 1, wherein said first and second coupling members comprise a polymeric material.

9. The coupling device of claim 1, wherein each of said first and second coupling members includes a stop wall at at least one end thereof to limit longitudinal movement of said coupling device relative to the rotary members.

10. The coupling device of claim 1, wherein said coupling members are adapted to engage the teeth of rotatable sprocket members.

11. The coupling device of claim 1, wherein said shape of each of said first and second coupling members is generally half of said cylinder.

12. A flexible coupling device for connecting a rotary driving member to a rotary driven member of a line shaft conveyor, the rotary members having a plurality of teeth around a circumference thereof, said coupling device comprising:

a first coupling member which includes a plurality of teeth extending longitudinally therealong, said first coupling member having a shape that is generally a portion of a cylinder, said first coupling member comprising an integral member made of flexible material and having first and second end portions; and a second coupling member which includes a plurality of teeth extending longitudinally therealong, said second coupling member having a shape that is generally another portion of said cylinder, said second coupling member comprising an integral member made of flexible material and having first and second end portions, said first and second coupling members being flexible and adapted to flex and wrap about the rotary driving and driven members, said plurality of teeth of said first and second coupling members being adapted to engage the plurality of teeth of the rotary members when said first and second coupling members are wrapped about the rotary members, said first and second coupling members being hingedly secured together at said first end portions and said first and second coupling members being securable together at said second end portions when said first and second coupling members are wrapped about the rotary member.

13. The flexible coupling device of claim 12, wherein said first coupling member includes a first longitudinal stop portion at opposite ends of said first coupling member and said second coupling member includes a second longitudinal stop portion at opposite ends of said second coupling member, said first and second longitudinal stop portions corresponding with one another to define first and second stop walls at opposite ends of said flexible coupling device for limiting longitudinal movement of said flexible coupling device relative to said rotary members.

14. The flexible coupling device of claim 12, wherein said first and second coupling members are engagable along said second end portions and securable together via a fastening member at least partially inserted through said second end portions.

15. The flexible coupling device of claim 14, wherein each of said second end portions includes overlapping portions, said fastening member being insertable through a passageway in said overlapping portions to secure said second end portions of said first and second coupling members together.

16. The flexible coupling device of claim 15, wherein said first end portions of said first and second coupling members are hingedly coupled together via at least one fastening member and are pivotable about said at least one fastening members to wrap said flexible coupling device about the rotary members.

17. The flexible coupling device of claim 12, wherein said first and second coupling members comprise neoprene rubber.

18. The flexible coupling device of claim 12, wherein said first and second coupling members define a generally continuous cylindrical casing when said first and second coupling members are wrapped around the rotary members.

* * * * *